United States Patent
Do et al.

(10) Patent No.: US 10,799,857 B2
(45) Date of Patent: Oct. 13, 2020

(54) PROCESS FOR MAKING AND USING METAL CATALYST FOR SLURRY HYDROCRACKING

(71) Applicant: UOP LLC, Des Plaines, IL (US)

(72) Inventors: Phuong T. M. Do, Mount Prospect, IL (US); Alakananda Bhattacharyya, Glen Ellyn, IL (US); Fred G. Sollberger, Des Plaines, IL (US); Lance A. Baird, Prospect Heights, IL (US); Grant H. Yokomizo, Mount Prospect, IL (US); Ping Sun, Riverside, IL (US); Mark Van Wees, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 3 days.

(21) Appl. No.: 16/143,251

(22) Filed: Sep. 26, 2018

(65) Prior Publication Data

US 2020/0094239 A1 Mar. 26, 2020

(51) Int. Cl.
| | |
|---|---|
| C10G 11/00 | (2006.01) |
| B01J 37/20 | (2006.01) |
| B01J 23/28 | (2006.01) |
| C10G 11/06 | (2006.01) |
| B01J 37/08 | (2006.01) |

(52) U.S. Cl.
CPC ............... *B01J 37/20* (2013.01); *B01J 23/28* (2013.01); *B01J 37/08* (2013.01); *C10G 11/06* (2013.01); *C10G 2300/1077* (2013.01); *C10G 2300/70* (2013.01)

(58) Field of Classification Search
CPC ........ C10G 45/08; C10G 45/16; C10G 47/00; C10G 47/06; C10G 47/26; C10G 2300/708; B01J 37/20
See application file for complete search history.

(56) References Cited

U.S. PATENT DOCUMENTS

| | | | | |
|---|---|---|---|---|
| 4,719,002 A | * | 1/1988 | Mayer | C10G 49/12 208/108 |
| 2010/0122939 A1 | * | 5/2010 | Bauer | C10G 47/26 208/425 |
| 2017/0128929 A1 | * | 5/2017 | Kumar | C01B 32/20 |

* cited by examiner

*Primary Examiner* — Prem C Singh
*Assistant Examiner* — Brandi M Doyle
(74) *Attorney, Agent, or Firm* — Paschall & Associates, LLC; James C. Paschall

(57) ABSTRACT

A process using a dealkylated aromatic liquid improves a heavy hydrocarbon liquid used for supporting molybdenum carbonized catalyst. Dealkylated aromatic liquid can be derived from heavy hydrocarbon materials that have been subjected to cracking, such as fluid catalytic cracking or slurry hydrocracking. The heavy hydrocarbon liquid can comprise a portion of resid SHC feed and a portion of a gas oil stream from SHC effluent.

13 Claims, 1 Drawing Sheet

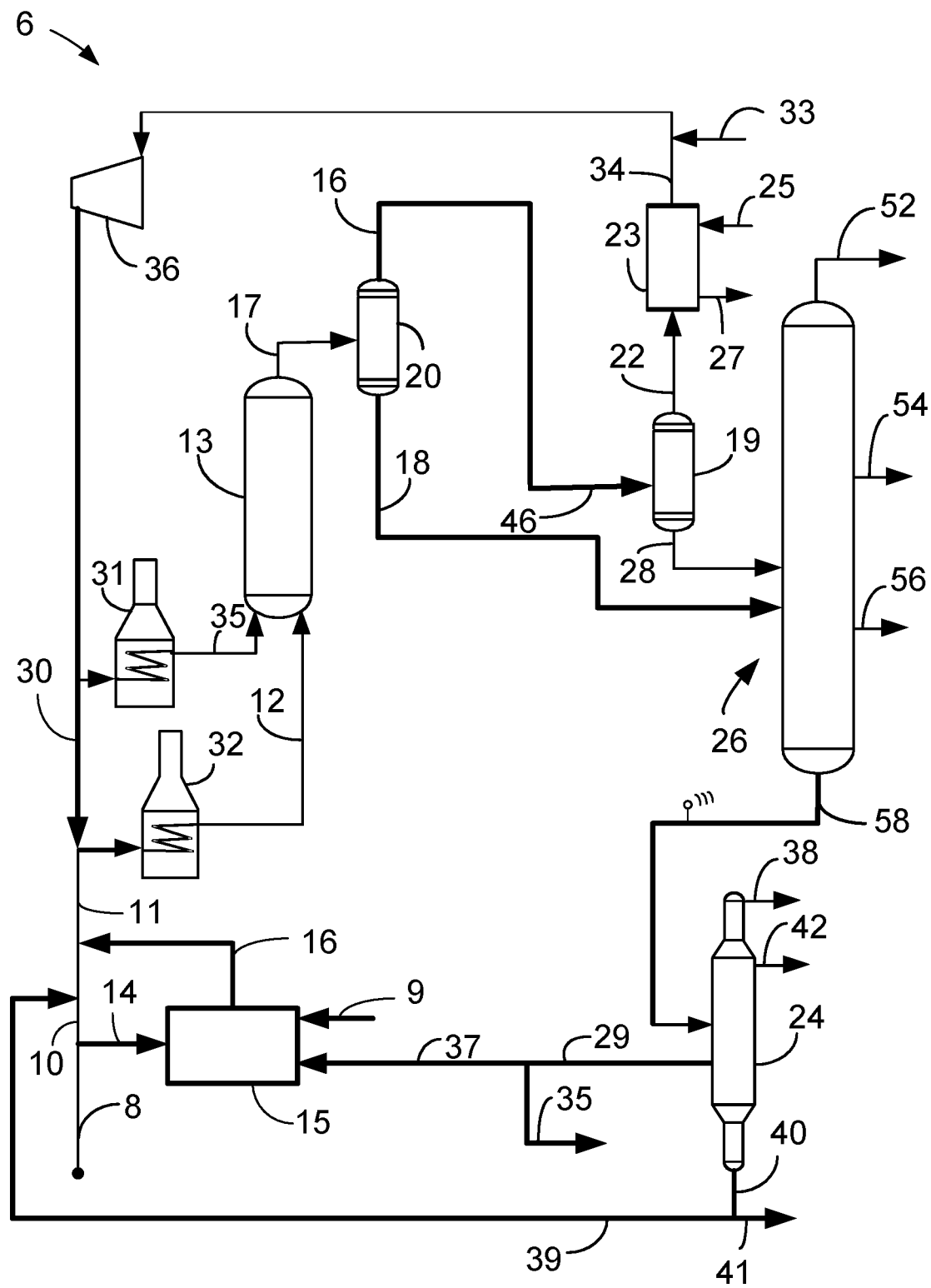

PROCESS FOR MAKING AND USING METAL CATALYST FOR SLURRY HYDROCRACKING

BACKGROUND

The field relates to a method of making a catalyst and a process for the treatment of crude oils and, more particularly, to the hydrocracking of heavy hydrocarbons in the presence of catalyst to provide useable products and further prepare feedstock for further refining.

As the reserves of conventional crude oils decline, heavy oils must be upgraded to meet world demands. In heavy oil upgrading, heavier materials are converted to lighter fractions and most of the sulfur, nitrogen and metals must be removed. Heavy oils contain a large portion of material boiling above 524° C. (975° F.) Or higher. These heavy hydrocarbon feed stocks may be characterized by low reactivity in visbreaking, high coking tendency, poor susceptibility to hydrocracking and difficulties in distillation. Most residual oil feed stocks which are to be upgraded contain some level of asphaltenes which are typically understood to be heptane insoluble and toluene soluble compounds as determined by ASTM D3279 or ASTM D6560. Asphaltenes are high molecular weight aromatic compounds which may contain heteroatoms which impart polarity.

Heavy oil must be upgraded in a primary upgrading unit before it can be further processed into useable products. Primary upgrading units known in the art include, but are not restricted to, coking processes, such as delayed or fluidized coking, and hydrogen addition processes such as ebullated bed or slurry hydrocracking (SHC). U.S. Pat. No. 5,755,955 describes a SHC process which has been found to provide high liquid yields with much reduced coke formation through the use of catalyst.

In SHC, a three-phase mixture of heavy hydrocarbon feed cracks in the presence of gaseous hydrogen over solid catalyst to produce lighter products under pressure at an elevated temperature. Iron sulfate has been disclosed as an SHC catalyst, for example, in U.S. Pat. No. 5,755,955. Iron sulfate monohydrate (ISM) is expensive and may not be sufficiently available to catalyze all of the SHC units the world may need to upgrade vast supplies of heavy oil. Other minerals such as bauxite have been shown to be an excellent SHC catalyst for example in U.S. Pat. No. 8,123,933 B2.

U.S. Pat. No. 5,171,727 describes a method for preparing a catalyst which involves introducing a metal and a heteropolyacid into an oil feed. The feed is then heated to form an organometallic compound, which is then converted to a catalyst under hydrocracking conditions. The metal is described as an oxide, sulfide, or salt of a Group IV to Group VIII metal. The heteropolyacid can be phosphomolybdic acid in an amount, expressed as molybdenum, of 0.01 wt % to 2 wt %.

Molybdenum catalyst systems of either oil-soluble molybdenum or a solid molybdenum on carbon matrix, known as carbonized molybdenum, are effective for SHC. Effective catalysts require the metal to be bonded onto the carbon support. Typically, heavy oil, that is SHC feed, can be used to provide the carbon support. Examples of heavy oil that have been used to provide carbon support include whole crude, atmospheric residue, or a mixture of vacuum residue with straight run VGO.

Toluene can be used as a solvent to dissolve and separate carbonaceous solids from lighter hydrocarbons in the SHC product. The solids not dissolved by toluene include catalyst and toluene insoluble organic residue (TIOR). TIOR includes coke and mesophase and is heavier and less soluble than asphaltenes. Mesophase formation is a critical reaction constraint in slurry hydrocracking reactions. Mesophase is a semi-crystalline carbonaceous material defined as round, anisotropic particles present in pitch boiling above 524° C. The presence of mesophase can serve as a warning that operating conditions are too severe in an SHC reactor and that coke formation is likely to occur under prevailing conditions.

Due to the anticipated demand for SHC operations to upgrade heavy oil, greater supplies of effective catalyst will become necessarily desirable. Better hydrocarbon materials to which metal such as molybdenum can effectively bond are desired to provide improved carbonized metal catalysts.

SUMMARY

We have found that dealkylated aromatic liquid improves heavy hydrocarbon liquid for producing molybdenum carbonized catalyst. Dealkylated aromatic liquid can be derived from heavy hydrocarbon materials that have been subjected to cracking, such as fluid catalytic cracking or slurry hydrocracking. Heavy hydrocarbon liquid can comprise a portion of resid SHC feed and a portion of a gas oil stream from SHC effluent.

BRIEF DESCRIPTION OF THE DRAWING

For a better understanding, reference is made to the accompanying drawing.

The FIGURE is a schematic flow scheme for an SHC process.

DEFINITIONS

The term "communication" means that fluid flow is operatively permitted between enumerated components, which may be characterized as "fluid communication". The term "communication" may also mean that data or signals are transmitted between enumerated components which may be characterized as "informational communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam. Stripping columns typically feed a top tray and take main product from the bottom.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, "pitch" means the hydrocarbon material boiling above about 524° C. (975° F.) AEBP as determined by any standard gas chromatographic simulated distillation method such as ASTM D2887, D6352 or D7169, all of which are used by the petroleum industry.

As used herein, the term "T5" or "T95" means the temperature at which 5 vol % or 95 vol %, as the case may be, respectively, of the sample boils using ASTM D-7169, ASTM D-86 or TBP, as the case may be.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.) using the TBP distillation method.

As used herein, "pitch conversion" means the conversion of materials boiling above 524° C. (975° F.) converting to material boiling at or below 524° C. (975° F.).

As used herein, "vacuum gas oil" means a hydrocarbon material having an IBP of at least about 232° C. (450° F.), a T5 of between about 288° C. (550° F.) and about 392° C. (700° F.), typically no more than about 343° C. (650° F.), As used herein, "heavy vacuum gas oil" means the hydrocarbon material having a T5 between about 300° C. (572° F.) and about 450° C. (842° F.) and a T95 between about 510° C. (950° F.) and about 570° C. (1058° F.), or an EP of no more than about 626° C. (1158° F.) prepared by vacuum fractionation of atmospheric as determined by any standard gas chromatographic simulated distillation method such as ASTM D2887, D6352 or D7169, all of which are used by the petroleum industry.

As used herein, "atmospheric residuum" means the hydrocarbon material boiling with an IBP of at least about 232° C. (450° F.), a T5 of between about 288° C. (550° F.) and about 392° C. (700° F.), typically no more than about 343° C. (650° F.), and a T95 between about 510° C. (950° F.) and about 700° C. (1292° F.) obtained from the bottoms of an atmospheric crude distillation column.

As used herein, "vacuum residuum" means the hydrocarbon material boiling with an IBP of at least 500° C. (932° F.) and an end point of at least 700° C. (1292° F.).

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, solvent "insolubles" means materials not dissolving in the solvent named.

The term "$C_x$" are to be understood to refer to molecules having the number of carbon atoms represented by the subscript "x". Similarly, the term "$C_{x-}$" refers to molecules that contain less than or equal to x and preferably x and less carbon atoms. The term "$C_{x+}$" refers to molecules with more than or equal to x and preferably x and more carbon atoms.

DETAILED DESCRIPTION

We have found that when used in the heavy hydrocarbon liquid for making metal carbonized catalyst, dealkylated aromatic liquid provides a more effective metal carbonized catalyst which requires less concentration of metal in a slurry hydrocracking reactor. Metal carbonized catalyst has metal sulfides bonded onto condensed asphaltene molecules. Clarified slurry oil or slurry hydrocracked gas oil provide superior dealkylated aromatic liquid for making metal carbonized catalyst. The dealkylated aromatic liquid included in the heavy oil when making metal carbonized catalyst can reduce the concentration of metal such as molybdenum required to catalyze a SHC reaction to sufficient conversion and selectivity to desirable products while suppressing formation of TIOR and mesophase.

The process is capable of processing a wide range of heavy residual hydrocarbon feedstocks. It can process aromatic feedstocks, as well as feedstocks which have traditionally been very difficult to hydroprocess; e.g., atmospheric or vacuum residuum, visbroken residue, deasphalted bottom materials, off-specification asphalt, sediment from the bottom of oil storage tanks, tar sands, bitumen, etc. Preferred feeds include atmospheric residuum and preferably, vacuum residuum. Suitable feeds include an API gravity of no more than 20 degrees, typically no more than 10 degrees and may include feeds with less than 5 degrees.

In an exemplary embodiment of an SHC process 6 as shown in the FIGURE, a heavy hydrocarbon resid stream is provided in a stock line 8. The heavy hydrocarbon resid stream in the stock line 8 may be divided into a resid concentrate portion comprising a resid concentrate stream and a resid feed portion comprising a resid feed stream. The resid concentrate portion is a smaller proportion of the resid stream in the stock line 8 than the resid feed stream. The resid concentrate portion of the heavy hydrocarbon feed stream in stock line 8 is fed to a catalyst preparation unit 15 in a concentrate line 14. A recycle pitch stream containing catalyst in line 39, a fresh catalyst concentrate stream in line 16 from the catalyst preparation unit 15 and a hydrogen stream in line 30 are added to a feed portion in feed line 10 of the heavy hydrocarbon feed stream from stock line 8. A combined heavy hydrocarbon feed stream in a combination line 11 is heated in the heater 32 and charged through an inlet line 12 into an inlet in the bottom of the tubular SHC reactor 13 to form a slurry in the reactor. Many mixing and pumping arrangements may be suitable. It is also contemplated that more than one heavy hydrocarbon feed stream may be added separately to the SHC reactor 13. Additional hydrogen from line 30 may be fed into the SHC reactor 13 through line 35 after undergoing heating in heater 31. The hydrogen in line 35 that is not premixed with feed may be added at a location above the feed entry in line 12. Both heavy hydrocarbon feed stream from line 12 and hydrogen in line 14 may be distributed in the SHC reactor 13 with an appropriate distributor. Preferably, the recycled pitch stream in line 39 makes up in the range of about 5 to 50 wt % of the feedstock to the SHC reactor 13, depending upon the quality of the feedstock and the once-through conversion level. The feed entering the SHC reactor 13 comprises three phases, solid catalyst particles and solid hydrocarbon feed, liquid hydrocarbon feed and gaseous hydrogen and vaporized hydrocarbon feed.

The process can be operated at quite moderate pressure, in the range of 3.5 MPa (g) (500 psig) to 24 MPa (g) (3500 psig) and preferably in the range of 10.3 MPa (g) (1500 psig) to 17.2 MPa (g) (2500 psig), without coke formation in the SHC reactor 13 with the appropriate catalyst. The reactor temperature is typically in the range of about 400 to about 500° C. with a temperature of about 440 to about 465° C. being suitable and a range of 445 to 460° C. being preferred. The LHSV is typically below about 4 $hr^{-1}$ on a fresh feed basis, with a range of about 0.1 to 3 $hr^{-1}$ being preferred and a range of about 0.3 to 1 $hr^{-1}$ being particularly preferred. Although SHC can be carried out in a variety of known reactors of either up or downflow, it is particularly well suited to a tubular reactor through which feed, catalyst and gas move upwardly. Hence, the outlet from SHC reactor 13 is above the inlet. Although only one is shown in the FIGURE, one or more SHC reactors 13 may be utilized in parallel or in series with interstage separation of converted product. Because the feed is converted to vaporous product, foaming tends to occur in the SHC reactor 13. An antifoaming agent may also be added to the SHC reactor 13, preferably to the top thereof, to reduce the tendency to generate foam. Suitable antifoaming agents include silicones as disclosed in U.S. Pat. No. 4,969,988.

A gas-liquid mixture is withdrawn from the top of the SHC reactor 13 through line 17 and separated preferably in a hot, high-pressure separator 20 kept at a separation temperature between about 200° C. (392° F.) and 470° C. (878° F.) and preferably at about the pressure of the SHC reactor. In the hot separator 20, the effluent from the SHC reactor 13 is separated into a gaseous stream 16 and a liquid stream 18. The liquid stream 18 contains HVGO. The gaseous stream 16 comprises between about 35 and 80 vol % of the hydrocarbon product from the SHC reactor 13 and is further processed to recover hydrocarbons and hydrogen for recycle.

The liquid stream 18 from the hot separator 20 may be further separated at lower temperature and/or stripped to provide a hot slurry hydrocracked liquid stream in line 18 to the product fractionation column 26.

The gaseous stream in line 16 may be passed to a cold high pressure separator 19. Within the cold separator 19, the product is separated into a gaseous stream rich in hydrogen which is drawn off through the overhead in line 22 and a liquid hydrocarbon product which is drawn off the bottom through line 28. The hydrogen-rich stream 22 may be passed through a packed scrubbing tower 23 where it is scrubbed by means of a scrubbing liquid in line 25 to remove hydrogen sulfide and ammonia. The spent scrubbing liquid in line 27 may be regenerated and recycled and is usually an amine. The scrubbed hydrogen-rich stream emerges from the scrubber via line 34 and is combined with fresh make-up hydrogen added through line 33 and recycled through a recycle gas compressor 36 and line 30 back to reactor 13. The bottoms line 28 may carry a cold slurry hydrocracked liquid stream to a further low pressure flash drum and/or a stripper before feeding the cold slurry hydrocracked liquid stream to the product fractionation column 26.

The product fractionation column 26 may comprise one or several vessels although it is shown only as one in the FIGURE. The product fractionation column 26 produces a $C_4$-stream recovered in overhead line 52, a naphtha product stream in line 54, a diesel stream in line 56 and a VGO/pitch stream in bottoms line 58.

The bottoms line 58 may carry the VGO/pitch stream to a vacuum fractionation column 24 maintained at a pressure between about 1.7 kPa (a) (0.25 psia) and 10.0 kPa (a) (1.5 psia) and at a vacuum distillation temperature resulting in an atmospheric equivalent cut point between light vacuum gas oil (LVGO) and HVGO of between about 250° C. (482° F.) and about 500° C. (932° F.). Three fractions may be separated in the vacuum fractionation column: an overhead fraction of residual diesel in an overhead line 38 which may be further processed or recycled from the line 38 back to the product fractionation column 26, a LVGO stream from a side cut in line 42, a HVGO stream from a side cut in line 29 and a pitch stream obtained in a bottoms line 40 which typically boils above 450° C. A product portion of the HVGO stream may be recovered in line 35 while, in an embodiment, a catalyst portion in line 37 may be used for preparing the catalyst concentrate. At least a portion of this pitch stream may be recycled back in line 39 to form part of the feed slurry to the SHC reactor 13. Remaining catalyst particles from SHC reactor 13 may be present in the pitch stream and may be conveniently recycled back to the SHC reactor 13. During the SHC reaction, it is important to minimize coking. Adding a lower polarity aromatic oil to the feedstock such as pitch reduces coke production. Any remaining portion of the pitch stream is recovered in line 41.

The catalyst prepared in the catalyst preparation unit 15 may comprise a metal. Molybdenum is the preferred metal, and the catalyst may be provided as carbonized molybdenum. Carbonized molybdenum can be prepared by first mixing or otherwise introducing a molybdenum catalyst precursor into a heavy hydrocarbon liquid, drying it of water, if necessary, to provide a catalyst precursor concentrate. A sulfiding agent may be added to the catalyst precursor concentrate at some point before pre-forming if sufficient sulfur is not present in the heavy hydrocarbon material. Pre-forming is effected by heating the catalyst precursor concentrate to an elevated temperature to provide a catalyst concentrate. If pre-forming is conducted in the presence of sufficient sulfur, activation and pre-forming occur together. The catalyst concentrate is preferably pre-formed and activated before entering the reactor 13. The term "sulfur" includes any compound comprising sulfur and elemental sulfur.

The heavy hydrocarbon liquid should be highly asphaltenic and comprise a highly dealkylated liquid to ensure dispersion of asphaltenes in the hydrocarbon liquid. The heavy hydrocarbon liquid may comprise no more than 11.3 wt %, suitably no more than 11.2 wt % and preferably no more than 11.1 wt % hydrogen. The heavy hydrocarbon liquid may have at least 7 wt %, suitably at least 8 wt % and preferably at least 9 wt % hydrogen. Hydrogen concentration may be determined by nuclear magnetic resonance. The heavy hydrocarbon liquid should have sufficient asphaltenes to support the catalytic metal. Sufficient asphaltenes are quantified by at least 3 wt % microcarbon residue, suitably at least 3.1 wt % microcarbon residue, more suitably at least 4 wt % microcarbon residue and preferably at least 7 wt % microcarbon residue using ASTM D4530-15. The heavy hydrocarbon liquid may have no more than 50 wt % and suitably no more than 30 wt % microcarbon residue. The heavy hydrocarbon liquid may have a density of at least about 0.90 g/cc and suitably at least about 0.98 g/cc. A sulfur content of about 0.5 to about 2 wt % sulfur will provide sufficient sulfiding agent to enable activation upon heating to an elevated temperature, although higher sulfur concentrations can be expected and are suitable.

In an embodiment, an asphaltenic liquid may be mixed with a dealkylated aromatic liquid to provide the heavy hydrocarbon liquid for producing the catalyst concentrate. The dealkylated aromatic liquid should be suitable for dispersing asphaltenes molecules to permit the metal component to bond onto a condensed asphaltene molecule. A suitable dealkylated aromatic liquid may comprise no more than about 11 wt % hydrogen. Additionally, a suitable dealkylated aromatic liquid may have a density of at least about 0.94 g/cc and preferably at least about 0.95 g/cc. Moreover, a suitable dealkylated aromatic liquid may have a solubility blending number of at least 60. The solubility blending number is determined according to the teachings of U.S. Pat. No. 5,997,723. The dealkylated aromatic liquid should have at least 30 wt % aromatics, preferably at least 35 wt % aromatics and suitably at least about 20 wt % polyaromatics and preferably at least about 24 wt % polyaromatics. Greater polarity of the dealkylated aromatic compounds enables better solubility, so a nitrogen content of at least 0.15 wt % nitrogen and preferably at least about 0.2 wt % nitrogen is advantageous with the presumption that much of the nitrogen is incorporated into aromatic compounds.

The dealkylated aromatic liquid is good solvent for dispersing asphaltenes. We have found clarified slurry oil from a FCC unit may be a suitable dealkylated aromatic liquid that can be provided from a main column bottoms of an FCC unit. Light cycle oil and heavy cycle oil taken as a side cut from an FCC main column may also be suitable dealkylated aromatic liquids due to their dealkylation in an FCC unit. We have also found gas oil recovered from slurry hydrocracked product may be a suitable aromatic hydrocarbon liquid due to the dealkylation that occurs in a SHC reactor. Slurry hydrocracked HVGO is a preferred aromatic hydrocarbon material because of its proximity to the SHC reactor 13 and the catalyst preparation unit 15. The slurry hydrocracked HVGO may be a little lighter than typical HVGO to draw in some lighter VGO such as having a T5 of between about 288° C. (550° F.) and about 450° C. (842° F.). The dealkylated aromatic liquid may be HVGO separated in lines 29 and 37 from the hydrocracked stream in line 17.

The asphaltenic liquid may include a higher boiling material having an IBP of at least about 232° C. (450° F.) and suitably at least about 500° C. (932° F.) and/or a T5 of between about 288° C. (550° F.) and about 392° C. (700° F.) such as an atmospheric resid or vacuum resid. The asphaltenic liquid should have sufficient concentration of asphaltenes to support the catalytic metal. Sufficient asphaltenes are quantified by at least 5 wt % microcarbon residue, suitably at least 6 wt % microcarbon residue, more suitably at least 7 wt % microcarbon residue and preferably at least 10 wt % microcarbon residue using ASTM D4530-15. The heavy hydrocarbon liquid may have no more than 50 wt % and suitably no more than 30 wt % microcarbon residue.

The dealkylated aromatic liquid and the asphaltenic liquid may be mixed at about 50 to about 150° C. or 70 to about 110° C. and atmospheric pressure. Care should be taken to avoid incompatibility between the asphaltenic liquid and the dealkylated aromatic liquid to avoid precipitating asphaltenes out of solution. The solubilizing properties of the dealkylated aromatic liquid are helpful in this regard. In an embodiment, the weight ratio of dealkylated aromatic liquid to asphaltenic liquid is from 1:9 to 7:3 and suitably 2:3 to 3:2. The dealkylated aromatic liquid may comprise about 10 to about 70 wt % and suitably at least about 40 wt % of the heavy hydrocarbon liquid. The asphaltenic liquid may be a concentrate portion of the heavy hydrocarbon resid feed stream that is diverted to make a catalyst concentrate in concentrate line 14.

A molybdenum compound may be converted or processed into a molybdenum catalyst precursor. A molybdenum catalyst precursor solution may be mixed with the heavy hydrocarbon liquid which may or may not contain a sulfiding agent. The molybdenum catalyst precursor may be water soluble. It is preferred that the molybdenum catalyst precursor be a polyacid of molybdenum. Preferred polyacids are those selected from the group consisting of heteropolyacids, such as the polyacids of molybdenum, preferably phosphomolybdic acid and molybdosilicic acid. Most preferred is phosphomolybdic acid. The term "phosphomolybdic acid" as used herein may include or designate aqueous solutions of the reaction product of $MoO_3$ with dilute phosphoric acid in which the phosphorus to molybdenum atomic ratio ranges from about 0.083 to about 2, preferably from about 0.083 to about 1 and most preferably from about 0.083 to about 0.5. A molybdenum catalyst precursor solution can contain one or more phosphomolybdic acid species such as the 12-molybdophosphoric acid and the dimeric 18-molybdophosphoric acid. Moreover, the crystalline 12- and 18-molybdophosphoric acids can be used to prepare the aqueous solutions of phosphomolybdic acid used herein. If such crystalline phosphomolybdic acids are used, additional $H_3PO_4$ or other phosphorus compounds may be added to the solution to provide the desired phosphorous-to-molybdenum ratio. The phosphomolybdic acid solution should have a molybdenum concentration of about 1 to about 20 wt %, suitably no more than about 16 wt % and preferably between about 6 and about 14 wt %.

A sufficient amount of the aqueous phosphomolybdic acid solution is mixed with the dealkylated aromatic liquid and the asphaltenic liquid to provide from about 0.05 to about 3 wt %, suitably from about 0.1 to about 2 wt %, and preferably from about 0.2 to about 1 wt % molybdenum, calculated as elemental molybdenum based on the heavy hydrocarbon liquid in the catalyst precursor mixture. Mixing conditions should be about 66 to about 135° C. and about 200 to about 1000 kPa. The resulting catalyst precursor mixture is a water-containing molybdenum catalyst precursor mixture; i.e., a wet molybdenum catalyst precursor concentrate. High shear mixing is an example of a suitable method for mixing an aqueous solution of the molybdenum catalyst precursor in the heavy hydrocarbon liquid. Mixing should be effected at a temperature and pressure to prevent the aqueous solution from boiling off. Due to the difference in boiling point between water and the heavy hydrocarbon liquid, the water from the solution can be removed after mixing during a drying or dehydration step by heating to a drying temperature, such as about 120 to about 180° C. and flashing it at a pressure of about 35 to about 276 kPa to provide a dried catalyst precursor concentrate. In an aspect, the dealkylated aromatic liquid comprises about 10 to about 70 wt % of the catalyst precursor concentrate.

The molybdenum component may be provided in a molybdenum catalyst precursor concentrate which may include molybdenum in a non-sulfided form. To pre-form the molybdenum catalyst precursor, the dried molybdenum catalyst precursor concentrate is heated, in the substantial absence of added hydrogen to an elevated temperature of at least about 275° C., preferably at an elevated temperature ranging from about 275° C. to about 425° C., more preferably from about 315° C. to about 410° C. and, most preferably from 330° C. to about 400° C. The total pressure in the heating step will range from about 0 kPa (g) (0 psig) to about 3500 kPa (g) (500 psig), preferably from about 173 kPa (g) (25 psig) to about 690 kPa (g) (100 psig). The molybdenum catalyst precursor concentrate is heated at the elevated temperature for an effective amount of time to convert the molybdenum catalyst precursor to the corresponding molybdenum catalyst. Under these conditions, the asphaltenes in the catalyst precursor are dispersed and condense from thermal cracking in the dealkylated aromatic liquid. The molybdenum molecules bond with condensed or polymerized asphaltene molecules to produce a solid molybdenum catalyst comprising a molybdenum molecule bonded to a condensed or polymerized asphaltene molecule in a hydrocarbon matrix, known as carbonized molybdenum. The pre-forming step is preferably performed in the presence of sulfur to ensure the formation of molybdenum sulfide and bonding of molysulfide molecules onto the condensed or polymerized asphaltene molecules in the catalyst concentrate to provide an activated catalyst. Otherwise, molyoxide molecules will bond to the condensed or polymerized asphaltene molecules to provide a catalyst in the concentrate that is still in need of activation.

A sulfidation process can be conducted during or after the pre-forming step. Sulfidation of the molybdenum is preferably conducted before the molybdenum catalyst precursor concentrate enters the slurry hydrocracking reactor 13 to ensure ample catalytic activity, but it may be conducted in the reactor. Sufficient sulfur concentration may already be present in the heavy hydrocarbon liquid perhaps provided by the concentrate portion of the resid stream that provides the asphaltenic liquid. If not, more sulfiding agent should be added to the heavy hydrocarbon liquid. The amount of sulfur present in the heavy hydrocarbon liquid should be present to achieve an atomic ratio of sulfur to molybdenum of from about 1/1 to about 8/1, preferably from about 2/1 to about 7/1 and, more preferably from about 3/1 to about 6/1. About 0.5 to about 2 wt % sulfur or more may be present in the catalyst concentrate to enable sufficient sulfidation of the molybdenum metal. In an aspect, most of the sulfur will be contributed by the asphaltenic liquid because the dealkylated aromatic liquid may have been significantly desulfurized during the process in which it is dealkylated. Suitable sulfiding agents include hydrogen sulfide, a blend of hydrogen sulfide and elemental sulfur with or without hydrogen. Suitable organic sulfiding agents include dimethyl disulfide, dimethyl sulfide, tertiary butyl polysulfide and thioacetamide.

In an aspect, the sulfiding agent may be added before or after the molybdenum catalyst precursor is added to it. The sulfiding agent can be added at any point in the preparation of catalyst concentrate as long as it is not contacted with an aqueous solution prior to being introduced into the heavy hydrocarbon liquid. For example, the sulfur can be added to the asphaltenic liquid or the dealkylated aromatic liquid or the mixture thereof before or after the molybdenum catalyst precursor concentrate has been dried.

The catalyst precursor concentrate or the catalyst concentrate may be exposed to a treat gas stream containing hydrogen sulfide as a sulfiding agent. The amount of hydrogen sulfide in the treat gas stream can range from about 0.5 mole % to about 10 mole %, or at least to about 2 mole %. If a sulfiding agent is added to the molybdenum catalyst precursor concentrate, sulfiding can occur simultaneously with pre-forming. Alternatively, the temperature for sulfidation can be similar to the temperature for slurry hydrocracking the heavy hydrocarbon feed stream, such as about 350° C. to about 480° C., or about 400° C. to about 480° C. The hydrogen partial pressure during sulfidation can also be similar to the pressure during slurry hydrocracking, and therefore can range from about 1.7 MPa (g) (250 psig) to 23.4 MPa (g) (3400 psig). The time of pre-forming can be any convenient amount of time and can typically be dependent on the conditions necessary for sulfidation. Examples of pre-forming times can range from about 0.01 hours to about 150 hours, depending on the severity of the conditions and the time the catalyst is resident within the slurry hydrocracking reactor.

The most preferred sulfiding agent is elemental sulfur. The elemental sulfur, is preferably either a sublimed powder or a concentrated dispersion of sublimed powder, such as commercialized flowers of sulfur, in heavy hydrocarbon material. Allotropic forms of elemental sulfur, such as orthorhombic and monoclinic sulfur are also suitable for use herein. The preferred physical form of sulfur is the sublimed powder, although sulfur may also be introduced as molten sulfur and as sulfur vapor. Elemental sulfur may be introduced to the catalyst precursor concentrate under high shear mixing under atmospheric nitrogen for about 5 to about 30 minutes at about 50 to about 100° C. The foregoing process step may be performed on the catalyst precursor mixture to serve add the sulfur to the mixture and to dry it to provide a catalyst precursor concentrate. Subsequently, the catalyst precursor concentrate may be heated to the elevated temperature to simultaneously pre-form and sulfide the catalyst precursor concentrate into the catalyst concentrate. The dealkylated aromatic liquid may comprise about 10 to about 70 wt % of the catalyst concentrate.

The catalyst concentrate may comprise a heavy hydrocarbon liquid with a T5 of between about 288° C. (550° F.) and about 450° C. (842° F.) and a T95 between about 510° C. (950° F.) and about 700° C. (1292° F.) comprising about 3 to about 25 wt % microcarbon residue and no more than about 11.5 wt % hydrogen, 0.5 to about 7 wt % sulfur, and about 0.2 to about 1 wt % molybdenum.

Turning back to the FIGURE, the molybdenum catalyst precursor may be added to the catalyst preparation unit 15 in line 9. After forming a sulfided molybdenum catalyst concentrate, the catalyst concentrate may be cooled to about 120 to about 180° C. and stored at slightly above atmospheric pressure. Catalyst concentrate in catalyst line 16 may be then remixed with a feed portion of the heavy hydrocarbon resid feed stream in the feed line 10 accompanied by the recycled pitch stream from recycle line 39 to provide a combined resid feed stream. The combined resid feed stream may be mixed with hydrogen from line 30, heated in a heater 32 and fed to the reactor 13 in the inlet line 12 to be reacted under slurry hydrocracking conditions in the slurry hydrocracking reactor.

The reaction conditions for slurry hydrocracking can be selected, so that the pitch conversion of the heavy hydrocarbon feed stream across all slurry hydrocracking reactors, if there is more than one arranged in series, is at least about 80%, such as at least about 85%, at least about 90%, or at least about 95%, optionally up to about 99%, or up to about 95%, or up to about 90%. The pitch stream comprising the portion of the heavy hydrocarbon feed stream that is unconverted after slurry hydrocracking from bottoms line 40 provides the recycled pitch stream in recycle line 39.

The heavy hydrocarbon resid feed stream from the stock line 8 in feed line 10 may have ample sulfur to supplement the sulfur in the catalyst concentrate in the catalyst concentrate line 16. Hence, heating to effect or finish sulfidation may occur in heater 32 and/or in reactor 12 if not done prior.

In various aspects, the concentration of molybdenum on a molybdenum basis in the heavy hydrocarbon feed stream to be slurry hydrocracked can be about 500 wppm or less, about 400 wppm or less, about 300 wppm or less, about 250 wppm or less, about 230 wppm or less, about 220 wppm or less, or about 200 wppm or less, or about 175 wppm or less, or about 150 wppm or less, and/or at least 10 wppm, or at least 25 wppm, or at least 50 wppm, or at least about 75 wppm, or at least 100 wppm. The heavy hydrocarbon material containing a resid fraction can be the same as or different from the to-be-slurry hydrocracked heavy hydrocarbon feed stream into which the catalyst concentrate is mixed.

The carbonized molybdenum catalyst can maintain TIOR in the product as a percentage of feed at no more than about 5 wt %, suitably no more than about 4 wt % and preferably no more than 3 wt %. The carbonized molybdenum catalyst can achieve this performance while pushing pitch conversion above 85, 90 or 95% and maintaining mesophase yield as a percentage of toluene insolubles below 5 wt % and preferably below 3 wt %.

Any of the above lines, units, separators, columns, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring components, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

EXAMPLES

Example 1

An Urals vacuum resid having a characterization in Table 1 was used to test the catalyst.

TABLE 1

| | |
|---|---|
| Density, g/cm$^3$ | 1.02 |
| Sulfur, wt % | 3.05 |
| Carbon, wt % | 85.75 |
| Hydrogen, wt % | 10.55 |
| Total Nitrogen, wt % | 0.65 |
| Basic Nitrogen, wt % | 0.17 |
| Heptane Insolubles, wt % | 1.8-2.4 |
| Micro Carbon Residue, wt % | 8.55 |
| Vanadium and Nickel, wppm | 330 |

Catalyst concentrates were prepared as follows. Phosphomolybdic acid was made by mixing molybdenum trioxide and phosphoric acid solution were reacted together to have 6.4 to 7.0 wt % molybdenum. Candidate aromatic liquids including slurry hydrocracked VGO, straight run VGO and clarified slurry oil and their properties are provided in Table 2.

TABLE 2

| Attributes | Straight Run VGO (217-161) | Straight Run VGO (83-2917) | Clarified Slurry Oil (85-3111) |
|---|---|---|---|
| S, % | 2.2 | 2.20 | 0.52 |
| N, % | 0.077 | 0.07 | 0.15 |
| H, % | 12.01 | 12.2 | 7.7 |
| Density (g/cc) | 0.923 | 0.9239 | 1.0858 |
| 1-ring Aromatics | — | — | 1.6 |
| 2-ring Aromatics | — | — | 8.1 |
| Poly-aromatics | — | — | 73.7 |
| Solubility blending number, $S_{BN}$ | — | 53.7 | — |
| Insolubility number, $I_N$ | — | 0 | — |

A heavy hydrocarbon liquid comprising 200 grams of Castilla vacuum resid or Tahe atmospheric resid and 200 grams of straight-run vacuum gas oil or clarified slurry oil (CSO) were mixed together at 80 to 100° C. Sufficient elemental sulfur was added to the heavy hydrocarbon liquid under high shear mixing under atmospheric nitrogen for 10 minutes at 80° C. to achieve a sulfur to molybdenum molar ratio of 3:1.28 to 31 grams of the phosphomolybdic acid were added to the heavy hydrocarbon liquid under stirring for 30 minutes. The catalyst precursor mixture of heavy hydrocarbon liquid, phosphomolybdic acid and sulfur was heated to 100° C. for 1 hour under atmospheric nitrogen to evaporate off the water until the temperature of the mixture reached 120° C. after which heat was terminated while mixing continued for another 30 minutes. The mixture was then pre-formed and activated in an autoclave at 350° C. under nitrogen blanket at 690 kPa (g) (100 psig) for 30 minutes while stirring to provide catalyst concentrates.

The catalyst concentrates comprising 0.5 wt % molybdenum were mixed with the Urals vacuum resid characterized in Table 1, so to have 200 wppm molybdenum in the feed and reacted at 450° C. and a hydrogen partial pressure of 13.8 MPa (g) (2000 psig) for 120 minutes. Oil soluble 15% molybdenum octoate available from Shepherd Chemical Company was used as a reference. Results are shown in Table 3.

TABLE 3

| | Mo concentration in PMA solution, wt % | MCR, wt % | H, wt % | Density, g/cc | Conversion to 975F-, % | TIOR, wt % |
|---|---|---|---|---|---|---|
| Mo octoate (reference) | n/a | — | — | ~1.1 | 86.6 ± 1.2 | 2.4 ± 0.1 |
| 50/50 SR VGO (217-161)/Castilla VR Microcat | 6.97 | 16.1 (est.) | 10.4 | 1.01 | 79.0 ± 0.8 | 9.2 ± 1.0 |
| 50/50 SR VGO (83-2917)/Tahe AR Microcat | 6.87 | 11.5 | 11 | 0.974 | 81.6 | 10.3 |
| 50/50 CSO (85-3111)/Castilla VR Microcat | 6.4 | >16 | 8.3 | 1.09 | 85.4 | 2.3 |

Table 3 shows that the use of dealkylated aromatic oil; e.g., clarified slurry oil, provides a catalyst that is much more effective than aromatic gas oil which has not been dealkylated as in the case of straight run VGO and provides better TIOR suppression and comparable conversion than the reference molybdenum octoate.

Example 2

A heavy Arab vacuum resid having a characterization in Table 4 was used to test the catalyst.

TABLE 4

| | |
|---|---|
| Density, g/cm³ | 1.05 |
| Sulfur, wt % | 5.3 |
| Carbon, wt % | 83.4 |
| Hydrogen, wt % | 9.5 |
| Total Nitrogen, wt % | 0.38 |
| Basic Nitrogen, wt % | 0.098 |
| Heptane Insolubles, wt % | 16.7 |
| Micro Carbon Residue, wt % | 29.3 |
| Vanadium and Nickel, wppm | 174 |

Catalyst concentrates were prepared as explained for Example 1. Phosphomolybdic acid was made by reacting molybdenum trioxide and phosphoric acid solution together to provide a product with 6 to 7 wt % molybdenum. Candidate aromatic liquids including slurry hydrocracked VGO and clarified slurry oil and their properties are provided in Table 5.

TABLE 5

| Attributes | P377R50-T676 SHC VGO | Clarified Slurry Oil (85-3111) |
|---|---|---|
| S, % | 1.25 | 0.52 |
| N, % | 0.748 | 0.15 |
| H, % | 10.66 | 7.7 |
| Density (g/cc) | 1 (est.) | 1.0858 |
| 1-ring Aromatics | 11.5 | 1.6 |
| 2-ring Aromatics | 4.2 | 8.1 |
| Poly-aromatics | 33.2 | 73.7 |

A heavy hydrocarbon liquid comprising 200 grams of Castilla vacuum resid and 200 grams of slurry hydrocracked vacuum gas oil or clarified slurry oil (CSO) were blended together at 80 to 100° C. Sufficient elemental sulfur was added to the heavy hydrocarbon liquid under high shear mixing under atmospheric nitrogen for 10 minutes at 80° C. to achieve a sulfur to molybdenum molar ratio of 3:1.28 to 31 grams of the phosphomolybdic acid was added to the heavy hydrocarbon liquid under stirring for 30 minutes. The catalyst precursor mixture of heavy hydrocarbon liquid, phosphomolybdic acid and sulfur was heated to 100° C. for 1 hour under atmospheric nitrogen to evaporate off the water until the temperature of the mixture reached 120° C. after which heat was terminated while mixing continued for another 30 minutes. The mixture was then pre-formed and activated in an autoclave at 350° C. under nitrogen blanket at 690 kPa (g) (100 psig) for 30 minutes while stirring to provide catalyst concentrates.

The catalyst concentrates comprising 0.5 wt % molybdenum were mixed with the Heavy Arab vacuum resid characterized in Table 4, so to have 300 wppm molybdenum in the feed and reacted at 450° C. and a hydrogen partial pressure of 13.8 MPa (g) (2000 psig) for 120 minutes. Oil soluble 15% molybdenum octoate available from Shepherd Chemical Company was used as a reference. Results are shown in Table 6.

TABLE 6

| | Mo concentration in PMA solution, wt % | MCR, wt % | H, wt % | Density, g/cc | Conversion to 975F-, % | TIOR, wt % |
|---|---|---|---|---|---|---|
| Mo octoate (reference) | n/a | — | — | 1.1 | 79.8 ± 0.9 | 4.2 ± 0.4 |
| 50/50 SHC VGO (P377R50T676)/Castilla VR | 6.97 | >16 | 9.8 | 1.04 (est.) | 78.43 | 3.97 |
| 50/50 CSO (85-3111)/Castilla VR Microcat | 66.4 | >16 | 8.3 | 1.09 | 78.8 | 3.4 |

Table 6 shows that the use of slurry hydrocracked VGO as a dealkylated aromatic oil to make the catalyst concentrate is as effective as clarified slurry oil in providing comparable TIOR suppression and conversion. Moreover, the slurry hydrocracked VGO provides a catalyst that is comparable to the reference molybdenum octoate.

Specific Embodiments

While the following is described in conjunction with specific embodiments, it will be understood that this description is intended to illustrate and not limit the scope of the preceding description and the appended claims.

A first embodiment of the invention is a process of slurry hydrocracking comprising mixing a molybdenum catalyst precursor, a dealkylated aromatic liquid comprising no more than about 11.0 wt % hydrogen and an asphaltenic liquid comprising at least 5 wt % microcarbon residue to provide a catalyst precursor concentrate; heating the catalyst precursor concentrate to an elevated temperature to form a slurry catalyst; and charging the catalyst precursor concentrate and a resid feed stream to a slurry hydrocracking reactor. An embodiment of the invention is one, any or all of prior embodiments in this paragraph up through the first embodiment in this paragraph further comprising heating the catalyst precursor concentrate to an elevated temperature in the presence of sulfur to form an activated catalyst concentrate. An embodiment of the invention is one, any or all of prior embodiments in this paragraph up through the first embodiment in this paragraph further comprising adding the catalyst concentrate to the resid feed stream before charging the catalyst precursor concentrate and the resid feed stream to the slurry hydrocracking reactor. An embodiment of the invention is one, any or all of prior embodiments in this paragraph up through the first embodiment in this paragraph wherein the molybdenum catalyst precursor comprises an aqueous solution of molybdenum compound. An embodiment of the invention is one, any or all of prior embodiments in this paragraph up through the first embodiment in this paragraph wherein the aqueous solution comprises about 6 to about 16 wt % molybdenum. An embodiment of the invention is one, any or all of prior embodiments in this paragraph up through the first embodiment in this paragraph, further comprising heating a catalyst precursor mixture of the molybdenum catalyst precursor, the dealkylated aromatic liquid and the asphaltenic liquid to about 100 to about 150° C. to dehydrate the catalyst precursor mixture to provide the catalyst precursor concentrate. An embodiment of the invention is one, any or all of prior embodiments in this paragraph up through the first embodiment in this paragraph further comprising adding a catalyst concentrate to the resid feed stream after heating the catalyst precursor concentrate to the elevated temperature to provide the catalyst concentrate. An embodiment of the invention is one, any or all of prior embodiments in this paragraph up through the first embodiment in this paragraph further comprising adding sulfur to the catalyst precursor concentrate before heating the catalyst precursor concentrate to the elevated temperature to provide an activated catalyst concentrate. An embodiment of the invention is one, any or all of prior embodiments in this paragraph up through the first embodiment in this paragraph, wherein the dealkylated aromatic liquid comprises slurry oil or slurry hydrocracked gas oil. An embodiment of the invention is one, any or all of prior embodiments in this paragraph up through the first embodiment in this paragraph further comprising heating the catalyst precursor concentrate to an elevated temperature in the slurry hydrocracking reactor after charging the catalyst precursor concentrate and a resid feed stream to the slurry hydrocracking reactor. An embodiment of the invention is one, any or all of prior embodiments in this paragraph up through the first embodiment in this paragraph further comprising adding the catalyst concentrate to a resid feed stream to crack hydrocarbons in the resid feed stream to provide a hydrocracked stream. An embodiment of the invention is one, any or all of prior embodiments in this paragraph up through the first embodiment in this paragraph further comprising separating the dealkylated aromatic liquid from the hydrocracked stream. An embodiment of the invention is one, any or all of prior embodiments in this paragraph up through the first embodiment in this paragraph, further comprising at least one of sensing at least one parameter of the process and generating or transmitting a signal or data from the sensing.

A second embodiment of the invention is a method of making a catalyst concentrate comprising mixing a molybdenum catalyst precursor, a dealkylated aromatic liquid comprising no more than about 11.0 wt % hydrogen and an asphaltenic liquid comprising at least 5 wt % microcarbon residue to provide a catalyst precursor mixture; and heating the catalyst precursor mixture to an elevated temperature to form a catalyst concentrate, wherein the dealkylated aromatic liquid comprises about 10 to about 70 wt % of the catalyst concentrate. An embodiment of the invention is one, any or all of prior embodiments in this paragraph up through the second embodiment in this paragraph further comprising adding sulfur to the catalyst precursor mixture before heating the catalyst precursor mixture to an elevated temperature to form an activated catalyst concentrate. An embodiment of the invention is one, any or all of prior embodiments in this paragraph up through the second embodiment in this paragraph wherein the molybdenum catalyst precursor is an aqueous solution of molybdenum compound and heating the catalyst precursor mixture to about 100 to about 150° C. to dehydrate the catalyst precursor mixture to provide the catalyst precursor concentrate. An embodiment of the invention is one, any or all of prior embodiments in this paragraph up through the second embodiment in this paragraph wherein the dealkylated aromatic liquid has a density of at least about 0.94 g/cc. An embodiment of the invention is one, any or all of prior embodiments in this paragraph up through the second embodiment in this paragraph further comprising adding the catalyst concentrate to a resid feed stream; cracking hydrocarbons in the resid feed stream to provide a hydrocracked stream and separating the dealkylated aromatic liquid from the hydrocracked stream.

A third embodiment of the invention is a method of making a slurry catalyst comprising mixing a molybdenum catalyst precursor, a dealkylated aromatic liquid comprising no more than about 11.0 wt % hydrogen, an asphaltenic liquid comprising at least 5 wt % microcarbon residue and sulfur to provide a catalyst precursor mixture; heating the catalyst precursor mixture to dehydrate the catalyst precursor mixture and provide a catalyst precursor concentrate; heating the catalyst precursor concentrate to an elevated temperature to form a catalyst concentrate; and adding the catalyst concentrate to a feed resid stream to provide a catalyst concentrated resid stream. An embodiment of the invention is one, any or all of prior embodiments in this paragraph up through the third embodiment in this paragraph further comprising charging the catalyst concentrated resid feed stream to a slurry hydrocracking reactor; cracking hydrocarbons in the resid feed stream to provide a hydrocracked stream and separating the dealkylated aromatic liquid from the hydrocracked stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process of slurry hydrocracking comprising:
    mixing a molybdenum catalyst precursor, a dealkylated aromatic liquid comprising no more than about 11.0 wt % hydrogen and an asphaltenic liquid comprising at least 5 wt % microcarbon residue to provide a catalyst precursor concentrate;
    heating the catalyst precursor concentrate to an elevated temperature to form a slurry catalyst; and
    charging said catalyst precursor concentrate and a resid feed stream to a slurry hydrocracking reactor.

2. The process of claim 1 further comprising heating the catalyst precursor concentrate to an elevated temperature in the presence of sulfur to form an activated catalyst concentrate.

3. The process of claim 1 further comprising adding catalyst concentrate to said resid feed stream before charging said catalyst precursor concentrate and said resid feed stream to the slurry hydrocracking reactor.

4. The process of claim 1 wherein said molybdenum catalyst precursor comprises an aqueous solution of molybdenum compound.

5. The process of claim 4 wherein said aqueous solution comprises about 6 to about 16 wt % molybdenum.

6. The process of claim 4, further comprising heating a catalyst precursor mixture of the molybdenum catalyst precursor, the dealkylated aromatic liquid and the asphaltenic liquid to about 100 to about 150° C. to dehydrate said catalyst precursor mixture to provide said catalyst precursor concentrate.

7. The process of claim 1 further comprising adding a catalyst concentrate to said resid feed stream after heating said catalyst precursor concentrate to said elevated temperature to provide said catalyst concentrate.

8. The process of claim 6 further comprising adding sulfur to said catalyst precursor concentrate before heating said catalyst precursor concentrate to said elevated temperature to provide an activated catalyst concentrate.

9. The process of claim 1, wherein the dealkylated aromatic liquid comprises slurry oil or slurry hydrocracked gas oil.

10. The process of claim 1 further comprising heating the catalyst precursor concentrate to an elevated temperature in the slurry hydrocracking reactor after charging said catalyst precursor concentrate and a resid feed stream to the slurry hydrocracking reactor.

11. The process of claim 1 further comprising adding said catalyst concentrate to a resid feed stream to crack hydrocarbons in said resid feed stream to provide a hydrocracked stream.

12. The process of claim 11 further comprising separating said dealkylated aromatic liquid from said hydrocracked stream.

13. The process of claim 1, further comprising at least one of:
    sensing at least one parameter of the process and generating or transmitting a signal or data from the sensing.

* * * * *